(12) United States Patent
Absher et al.

(10) Patent No.: US 12,141,742 B2
(45) Date of Patent: Nov. 12, 2024

(54) SYSTEM AND METHODS FOR DYNAMIC IDENTIFICATION OF ORDER FULFILLMENT OPTIONS USING AN APPLICATION PROGRAMMING INTERFACE

(71) Applicant: FLEXE, INC., Seattle, WA (US)

(72) Inventors: Bryan Absher, Seattle, WA (US); Michael Thanh-Hung Hotan, Seattle, WA (US); Seth Daniel Johnson, Portland, OR (US); Megan Marie Quintero, Redwood City, CA (US); Steven Stevenson, Seattle, WA (US); Halim Khoury, Seattle, WA (US)

(73) Assignee: FLEXE, INC., Seattle, WA (US)

( * ) Notice: Subject to any disclaimer, the term of this patent is extended or adjusted under 35 U.S.C. 154(b) by 0 days.

(21) Appl. No.: 17/941,928

(22) Filed: Sep. 9, 2022

(65) Prior Publication Data
US 2024/0086829 A1  Mar. 14, 2024

(51) Int. Cl.
*G06Q 10/0834* (2023.01)
*G06Q 10/087* (2023.01)
*G06Q 30/0601* (2023.01)

(52) U.S. Cl.
CPC ..... *G06Q 10/08345* (2013.01); *G06Q 10/087* (2013.01); *G06Q 30/0635* (2013.01)

(58) Field of Classification Search
CPC .......... G06Q 10/08345; G06Q 10/087; G06Q 30/0635

USPC ....................................................... 705/335
See application file for complete search history.

(56) References Cited

U.S. PATENT DOCUMENTS

| | | | |
|---|---|---|---|
| 2016/0063583 A1* | 3/2016 | Nuthulapati | G06Q 10/083 705/26.2 |
| 2022/0067751 A1* | 3/2022 | Sanchez | G06Q 10/08345 |

OTHER PUBLICATIONS

"Warehouse inventory management system using IoT and open-source framework" Published by Elsevier (Year: 2018).*

* cited by examiner

*Primary Examiner* — Zeina Elchanti
(74) *Attorney, Agent, or Firm* — PERKINS COIE LLP

(57) ABSTRACT

Systems and methods for identifying options for order fulfillment using an API are provided. The system receives, via the API, an order inquiry comprising customer information and item information about an item sold via a merchant website. The order inquiry can be received in response to a customer placing the item in an electronic shopping cart. The item information includes an item identifier and a quantity. The customer information includes a customer address. Using the item information and the customer information, the system identifies warehouse nodes and carriers via which the item can be delivered to the customer. The system confirms inventory of the item in the warehouse nodes. For each warehouse node with sufficient inventory, the system identifies shipping options for the item, including levels of service, cutoff order times, and prices. The system then generates fulfillment options for the item and provides the options to the merchant website.

20 Claims, 9 Drawing Sheets

FIG. 2B ground
SYSTEM AND METHODS FOR DYNAMIC IDENTIFICATION OF ORDER FULFILLMENT OPTIONS USING AN APPLICATION PROGRAMMING INTERFACE

BACKGROUND

Order fulfillment is the process by which products are delivered to a customer after ordering from a point-of-sale location, such as a check-out counter or a merchant website. Merchants, such as online sellers, often compete with each other in the number and type of fulfillment options that they offer to customers. For example, online sellers may compete to offer faster order fulfillment using expedited shipping, or online sellers may want to offer a range of available fulfillment options to allow customers to select different options based on the associated cost and time of delivery. For merchants like Amazon, which owns and controls its own network of warehouses, it is easy to generate different fulfillment options since they control all aspects of that network and the shipping process. However, for merchants that do not operate their own warehouses and instead rely on third parties for the provision of warehouse services, it can be difficult to offer different fulfillment options to a customer's specified delivery address. Because they don't own or operate the warehouses, they are dependent on the limited and typically fixed options that warehouse operators have pre-negotiated and agreed to provide as part of their warehousing services. It would therefore be beneficial to provide improved systems and methods for expanded fulfillment options for customers, particularly in situations where the retailer is relying on third-party warehouse operators.

BRIEF DESCRIPTION OF THE DRAWINGS

FIG. 2B is a display diagram illustrating an example of a shopping cart of a merchant website displayed in a web browser.

Figure 1:
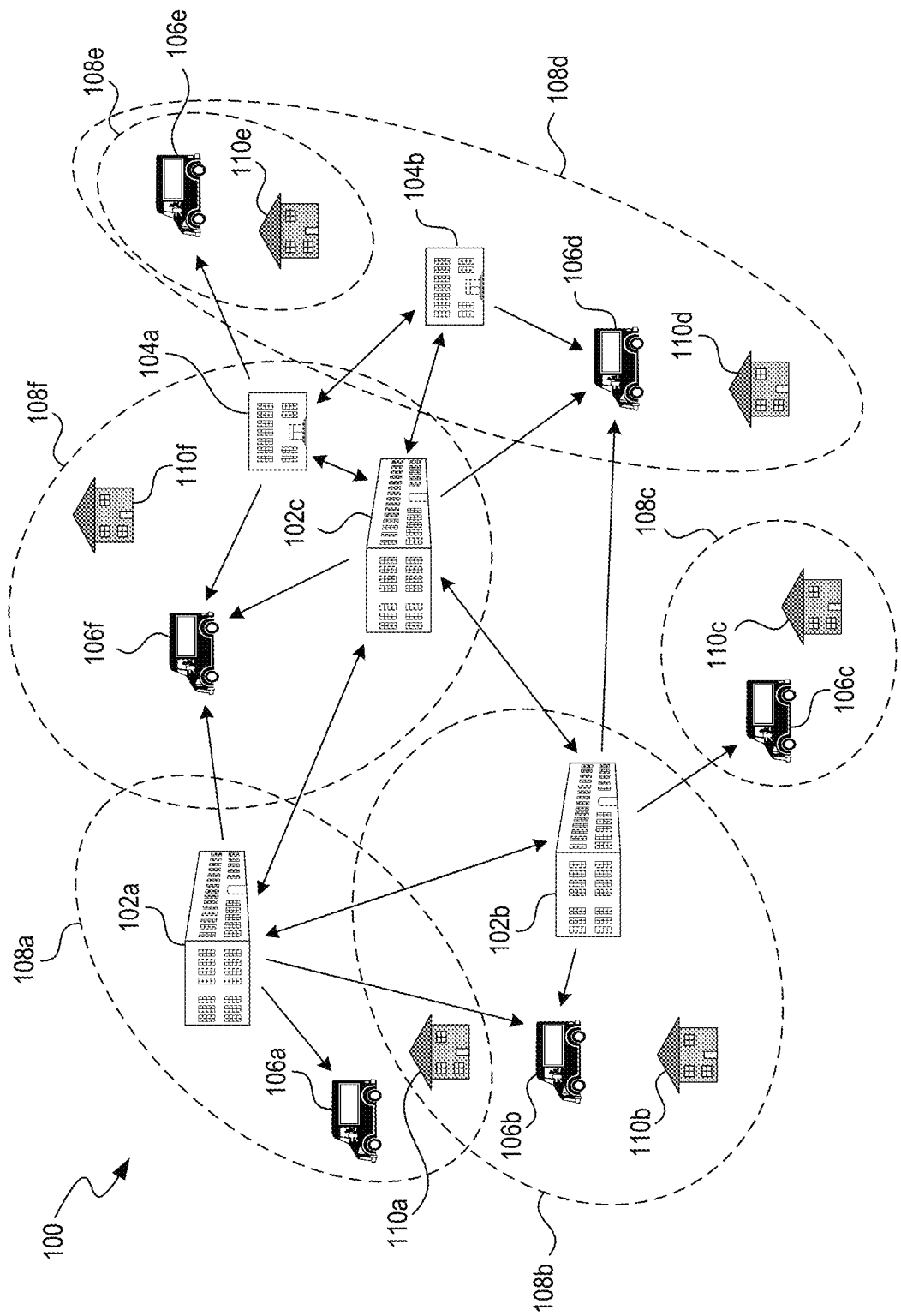
FIG. 1 is a schematic illustration of an example fulfillment network for delivery of items from warehouse nodes to customers.

The techniques introduced in this disclosure can be better understood by referring to the following Detailed Description in conjunction with the accompanying drawings.

DETAILED DESCRIPTION

An improved interface for a fulfillment system ("the system") that allows the dynamic identification of options for expedited order fulfillment, and associated methods, are disclosed herein. The system receives an electronic order inquiry via an application programming interface (API), the order inquiry comprising customer information and item information about an item available for sale from a merchant (e.g., via a merchant website). The electronic order inquiry can be received, for example, from a computing system associated with the merchant or from a computing system associated with an electronic shopping cart service utilized by the merchant. The item information includes identifying information for the item (e.g., an item identifier, an item description, etc.) and a quantity of items. The customer information includes a customer address to which the items are to be delivered. Using the item information and the customer information, the fulfillment system identifies one or more warehouse nodes and associated carriers that can deliver the item or items to the customer. The system then confirms inventory of the item or items in the one or more warehouse nodes. For each warehouse node with sufficient inventory, the system identifies shipping options for the item, including levels of service (e.g., based on estimated delivery times), cutoff order times for each level of service, and prices for each level of service. The system then generates, in response to the API order inquiry, an electronic fulfillment response for transmission via the API, the electronic fulfillment response including one or more fulfillment options for the item or items, each including one or more of a carrier or carriers capable of delivering the item, available levels of service, costs for each level of service, and cutoff times for order submission at each level of service.

In an example implementation, a merchant may wish to offer free or reduced cost expedited shipping options for products of interest to certain customers, either to match offers by other merchants or to otherwise incentivize customers to shop with the merchant. Computing systems associated with the merchant transmit a fulfillment inquiry to the system to quickly (e.g., within seconds) receive an electronic fulfillment message with different expedited delivery options to ship the requested products to the customer. Based on various encoded business rules, the merchant's systems may elect to display one or more of the expedited delivery options to the customer. Those business rules may be selected to reduce the cost borne by the merchant arising from the offer for free or reduced cost expedited delivery.

Advantages of the system include providing a single interface that allows access to expedited fulfillment options across multiple warehouse nodes that may use different hardware and software systems to track inventory and provide order fulfillment. The single interface further provides a unified view into warehouse nodes that are otherwise owned and/or operated by different entities. That is, the present technology provides an improved technical solution to the problem of having to otherwise electronically communicate with multiple warehouse operators, each using a communication format potentially unique to that warehouse operator as a result of the disparate fulfillment systems used by each warehouse operator, in order to identify different fulfillment options across those multiple warehouse nodes.

Additionally, the disclosed system provides a centralized platform for identifying and/or recommending fulfillment options across multiple warehouses and/or carriers that are not owned or controlled by a merchant associated with the system.

Various implementations of the system and methods will now be described. The following description provides specific details for a thorough understanding and an enabling description of these implementations. A person skilled in the art will understand, however, that the system and methods can be practiced without many of these details or with alternative approaches. Additionally, some well-known structures or functions may not be shown or described in detail to avoid unnecessarily obscuring the relevant description of the various implementations. The terminology used in the below description is intended to be interpreted in its broadest reasonable manner, even though it is being used in conjunction with a detailed description of certain specific implementations of the system and methods.

FIG. 1 is a schematic illustration representing portions of an example fulfillment network 100 for movement of items from warehouse nodes to customers. The fulfillment network 100 includes multiple warehouse nodes 102a-c (e.g., fulfillment centers (FCs), distribution centers (DCs)) that receive and store items available for sale from multiple merchants (not shown). The transfer of inventory from a merchant to a warehouse node may be referred to herein as an "inbound" transfer. The warehouse nodes 102a-c can be geographically distributed such that each warehouse node is located in a different geographic region (e.g., different neighborhood, city/town, county, ZIP code, area code, state, region, country, etc.). A warehouse node can operate as a single independent facility (e.g., warehouse nodes 102a-n) or according to a hub-and-spoke model (e.g., warehouse node 102c serves as a centralized "hub" for receiving and routing inventory to satellite "spoke" warehouse nodes 104a-n). Inventory can be transferred between warehouse nodes 102a-n, between hub warehouse node 102c and its spoke warehouse nodes 104a-n, and/or between spoke warehouse nodes 104a-n.

The fulfillment network 100 includes a large number of warehouse nodes, such as hundreds or thousands of warehouse nodes. The operator of the fulfillment network need not own, lease, operate, or otherwise directly control any of the warehouse nodes. For example, the warehouse nodes can be owned and operated by third-party warehouse operators. Different warehouse nodes can be owned and operated by different warehouse operators. For example, warehouse nodes 102a-c can be owned and operated by one, two, or three operators. Different warehouse operators can have different procedures for receiving, storing, and shipping items, and can use different software and hardware systems to operate their warehouse nodes (e.g., to track items, arrange shipping, fulfill orders, etc.). As such, merchants utilizing the warehouse nodes for shipment of items face a daunting coordination and management challenge if attempting to electronically interface with each of the warehouse nodes for integration purposes.

For example, different hardware and software systems used by warehouse operators pose a difficult technical challenge when a merchant needs to quickly (e.g., within seconds or minutes) assess fulfillment options across different warehouse nodes, which may each indicate inventory and shipping options in different ways (e.g., using different software systems, data structures, file formats, etc.). As described below, the fulfillment system offers a unified technical interface to data associated with large numbers of third-party operated warehouse nodes, thus allowing merchants to conveniently and dynamically leverage the capabilities of the full warehouse node network for inventory storage, while at the same time providing a uniform mechanism for merchant computers to identify expedited fulfillment options based on desired characteristics (e.g., price, speed, etc.).

The fulfillment network 100 includes multiple carriers 106a-f that receive and deliver items stored in the warehouse nodes to multiple different delivery regions 108a-f and customers 110a-f. The transfer of items from a warehouse node to a customer may be referred to herein as an "outbound" transfer. Each carrier provides shipping services to a respective delivery region at various levels of service characterized by expected speed of delivery, e.g., carrier 106a ships to delivery region 108a with delivery to customers within certain time frames A, B, or C, carrier 106b ships to delivery region 108b with delivery to customers within certain time frame A, C, D, or F, etc. Typical delivery time frames may include 2-hour delivery, same day delivery, next day delivery, next business day delivery, 2-day delivery, or other service levels determined by the carrier. Expected speed of delivery and/or other characteristics of levels of carrier service can be defined in carrier published service levels or in service-level agreements (SLAs) existing between carriers and warehouse node operators or carriers and merchants using those warehouse nodes to ship inventory. The size and/or location of the delivery region can vary from carrier to carrier such that different carriers provide shipping services to different geographic regions, at various levels of service. Some carriers can serve delivery regions identical or similar to the delivery regions served by other carriers, with the same or different levels of service for each of those regions. There can be some degree of overlap between delivery regions (e.g., delivery region 108a partially overlaps delivery region 108b). Conversely, some delivery regions may not overlap with any other delivery region (e.g., delivery region 108c). Optionally, a larger delivery region served by a carrier can completely encompass a smaller delivery region served by another carrier (e.g., delivery region 108d encompasses delivery region 108e). For purposes of this description, a level of service associated with a carrier indicates that the carrier has a high statistical likelihood (e.g., at least a 75%, 90%, 95%, or 99% likelihood) of being able to deliver to a particular address within the corresponding timeframe (e.g., same day, next day, next business day, or same week, etc.).

The delivery regions 108a-f include customers 110a-f that purchase items from merchants. The customers 110a-f can purchase a merchant's items through a variety of different sales channels. Items can be purchased, for example, at a physical location maintained by the merchant, at a physical channel operated by a merchant partner, by calling a merchant phone number, through a website or application that offers a merchant's products, etc. Purchases made at a merchant website can be conducted using an electronic shopping cart, which may be provided by a third-party shopping cart partner of the merchant. For example, a merchant website can use an electronic shopping cart feature provided by the shopping cart partner, which may provide functionality such as managing a digital storefront with shopping cart, validating address and payment information during purchases, transmitting purchase information on behalf of the merchant, etc. Representative third-party shopping cart partners include WooCommerce, Skava, and Kibo, though it will be appreciated that merchants may utilize other platforms that provide similar services.

After purchase, products are delivered to customers via different carrier services. The customers 110*a-f* are geographically distributed among the delivery regions 108*a-f* such that different customers can be served by different carriers. A customer located in multiple delivery regions can receive shipments from multiple carriers, e.g., customer 110*a* is located in delivery regions 108*a-n* and can receive shipments from carriers 106*a-n*. Carriers 106*a* and 106*b* may offer delivery to customer 110*a* within a similar time frame, e.g., same-day, next-day, within 2 days, etc. Or carriers 106*a* and 106*b* may offer delivery to customer 110*a* within different time frames. For example, carrier 106*a* may be able to deliver to customer 110*a* within 1 day of receipt of order, whereas carrier 106*b* may be able to deliver to customer 110*a* within 2 days of receipt of order. A customer located in a single delivery region can receive shipments from a single carrier, e.g., customer 110*c* is located in a single delivery region 108*c* and receives shipments only from carrier 106*c*.

In the fulfillment network 100, each warehouse node is served only by certain carriers. For example, warehouse node 102*a* is served by carriers 106*a*, 106*b*, and 106*f*; warehouse node 102*b* is served by carriers 106*b*, 106*c*, and 106*d*; warehouse node 102*c* is served by carriers 106*d* and 106*f*; spoke warehouse node 104*a* is served by carriers 106*e* and 106*f*; and spoke warehouse node 104*b* is served by carrier 106*d*. As a result, a warehouse node can ship inventory only to customers located in the delivery regions served by its carrier(s). For example, warehouse node 102*a* can ship inventory to customers 110*a-b* and 110*f*; but not to customers 110*c-e*.

In the fulfillment network 100, each warehouse node may receive and store items of more than one merchant. The manner in which the inventory of multiple merchants is apportioned to multiple warehouse nodes may be determined by a warehouse apportioning system. The warehouse apportioning system may further determine which warehouse node and carrier will be used to supply and deliver a merchant's item to a customer. In other words, in some embodiments of the fulfillment network 100, merchants do not directly control where their inventory is stored or how purchased inventory is delivered to a customer. An example warehouse apportioning system is described in U.S. patent application Ser. No. 16/983,868, filed on Aug. 3, 2020 and titled "SYSTEM AND ASSOCIATED METHODS FOR APPORTIONMENT OF INVENTORY BETWEEN WAREHOUSE NODES TO ACHIEVE REQUESTED SERVICE LEVELS," the entirety of which is incorporated herein by reference.

A merchant may use different warehouse nodes and/or different carriers to deliver items to customers based on a variety of factors, such as location of a customer, location of a warehouse with the item in stock, time of receipt of an order, price for different levels of carrier service, and so forth. For example, customer 110*a* can order an item from a merchant website, and the item may be in stock at warehouse node 102*a* with delivery by carrier 106*a* as well as at warehouse node 102*b* with delivery by carrier 106*b*. In addition, carrier 106*a* and carrier 106*b* can deliver the same item at various levels of service and for different prices. Thus, carrier 106*a* may be able to deliver the item to customer 110*a* with same-day delivery at a price of $9.95, while carrier 106*b* can deliver the same item to customer 110*a* with next-day delivery at a price of $5.95. Each of these shipping options may be available subject to certain order conditions, such as receipt of an order by a certain cutoff time in order to qualify for a certain delivery level of service. For example, for same-day delivery, an order may need to be received before 11 am in order for the warehouse node to process the order and make the order available for pickup by carrier 106*a* prior to 3 pm. In some implementations, carriers may offer certain levels of service (e.g., same-day delivery) in limited circumstances, such as based on a delivery radius or other measure of proximity to a warehouse node or only to certain ZIP codes, and so forth.

Figure 2A:
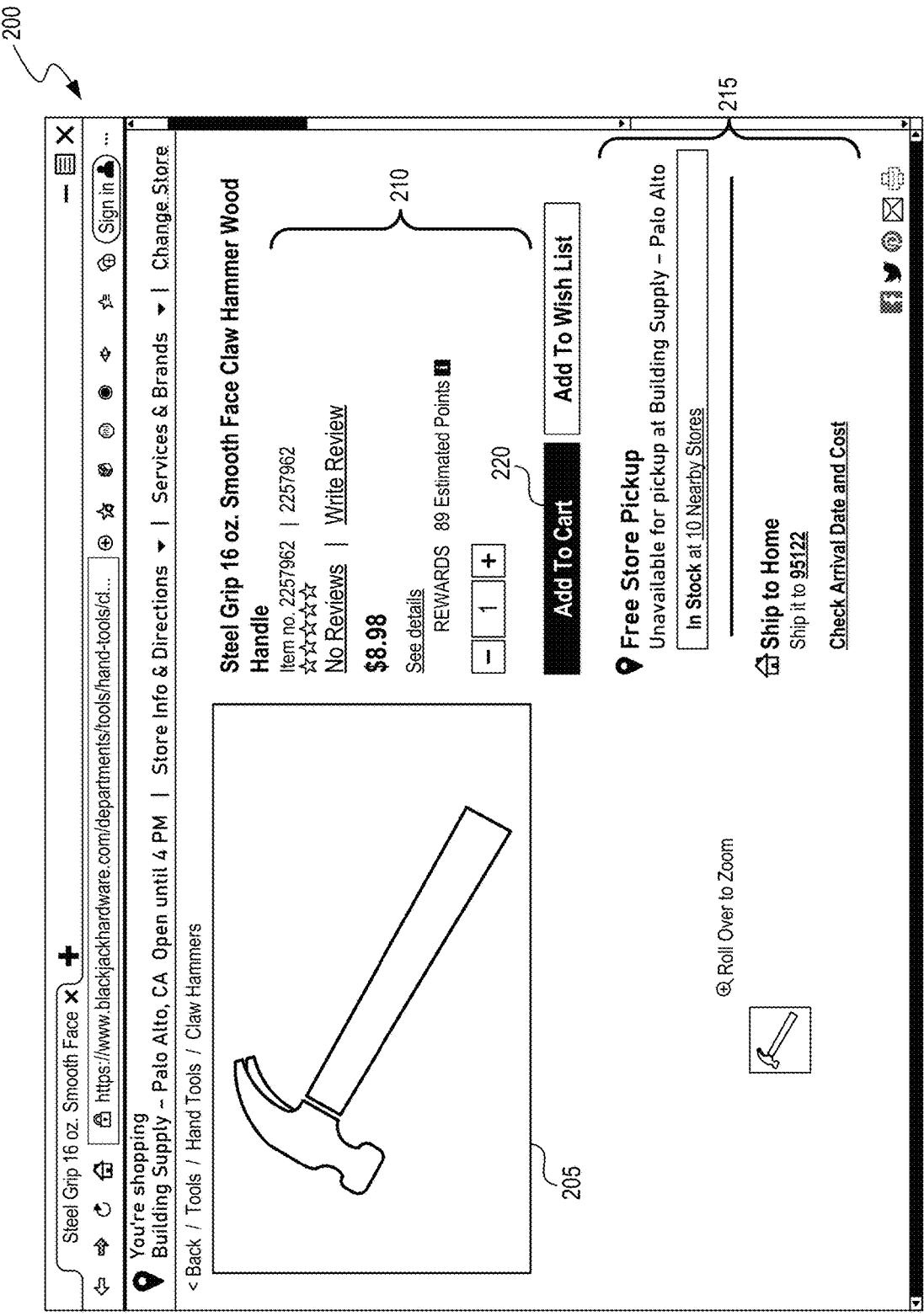
FIG. 2A is a display diagram illustrating an example of a merchant website displayed in a web browser.

FIG. 2A is a display diagram illustrating an example user interface 200 that displays, in a web browser, an item available for purchase via a merchant website. The interface 200 can be provided by computing system managed by a merchant or by a third party service utilized by the merchant, and accessed, for example, by one of the customers 110*a-c* using a computing device, including without limitation a laptop or desktop computer, a tablet, a smartphone or other mobile device, or a wearable device. The interface 200 displays a photo 205 depicting the item and item information 210, such as a description of the item, a price for the item, a quantity selector for the item, an identifier for the item (e.g. a stock-keeping unit (SKU) or other item identifier), and so forth. The interface 200 further displays shipping information 215. In the depicted interface, the shipping information 215 includes two options for the customer to select from, namely in-store pickup or ship to home. In addition, the interface 200 includes an "Add to Cart" icon 220 that can be selected by a customer to place the item into an electronic shopping cart. Although not depicted in FIG. 2A, the customer can provide shipping information via the merchant website, such as by providing specific address information (e.g., a mailing or billing address) or by the customer entering general delivery information (e.g., a zip code or other region) to the merchant website. In some embodiments, the customer may have a stored account containing default shipping information with the merchant or the third-party service. In that case, the customer does not need to provide shipping information unless it is different from the stored information.

Figure 2B:
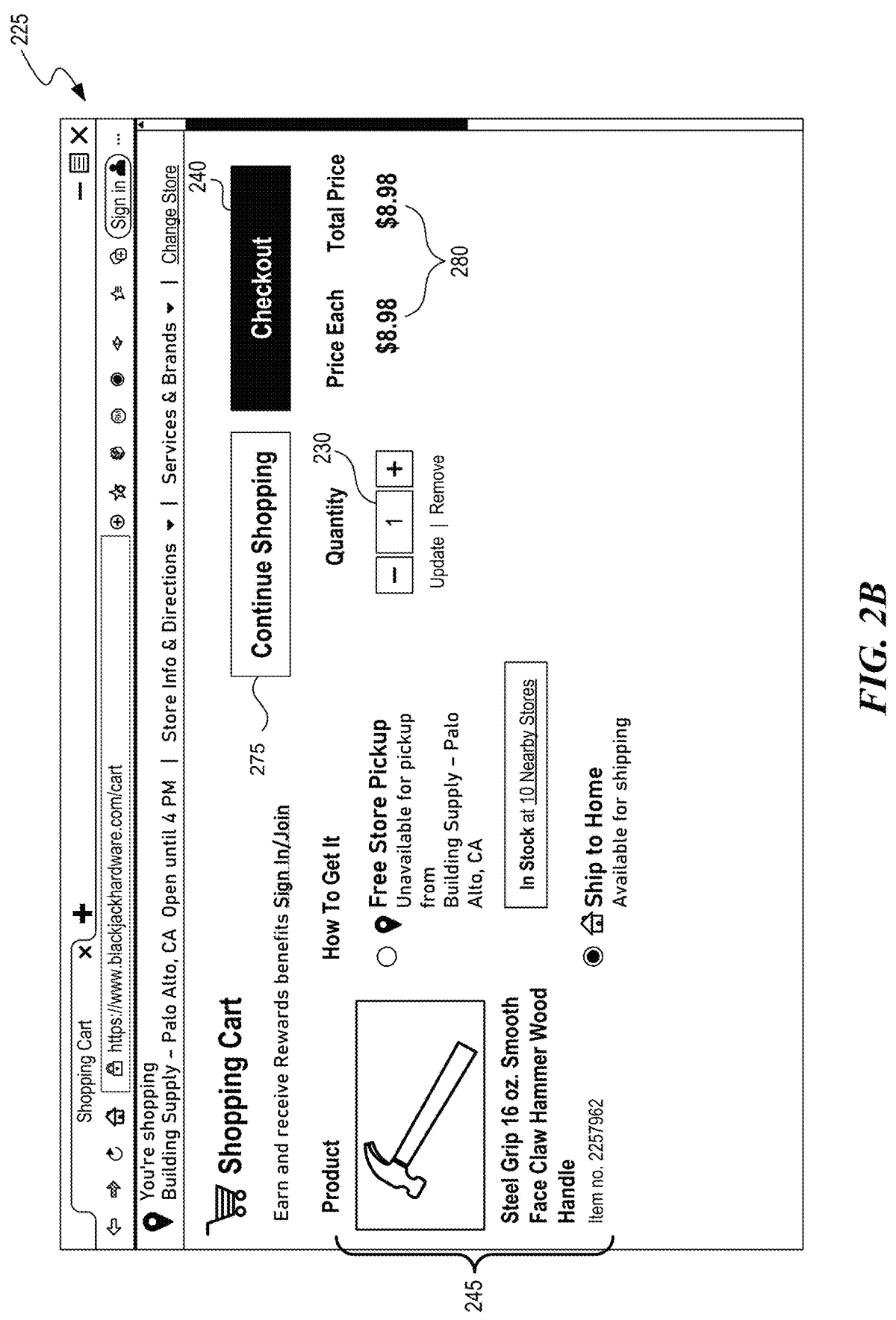

FIG. 2B is a display diagram illustrating an example user interface 225 of an electronic shopping cart that displays items selected by the customer for purchase. In the depicted example, the electronic shopping cart includes the item that the customer selected in FIG. 2A. The interface 225 is generated by the merchant computing system or by the third-party computing system and displayed to the customer upon selecting the "Add to Cart" icon 220. The customer is able to add or remove items from the shopping car using the item quantity control 230. Any changes to the item quantity are reflected in the total displayed price for the item. The customer may also continue shopping to identify additional products to add to the shopping cart by selecting the continue shopping button 235. When the customer is ready to checkout, the customer selects a checkout button 240.

Figure 2C:
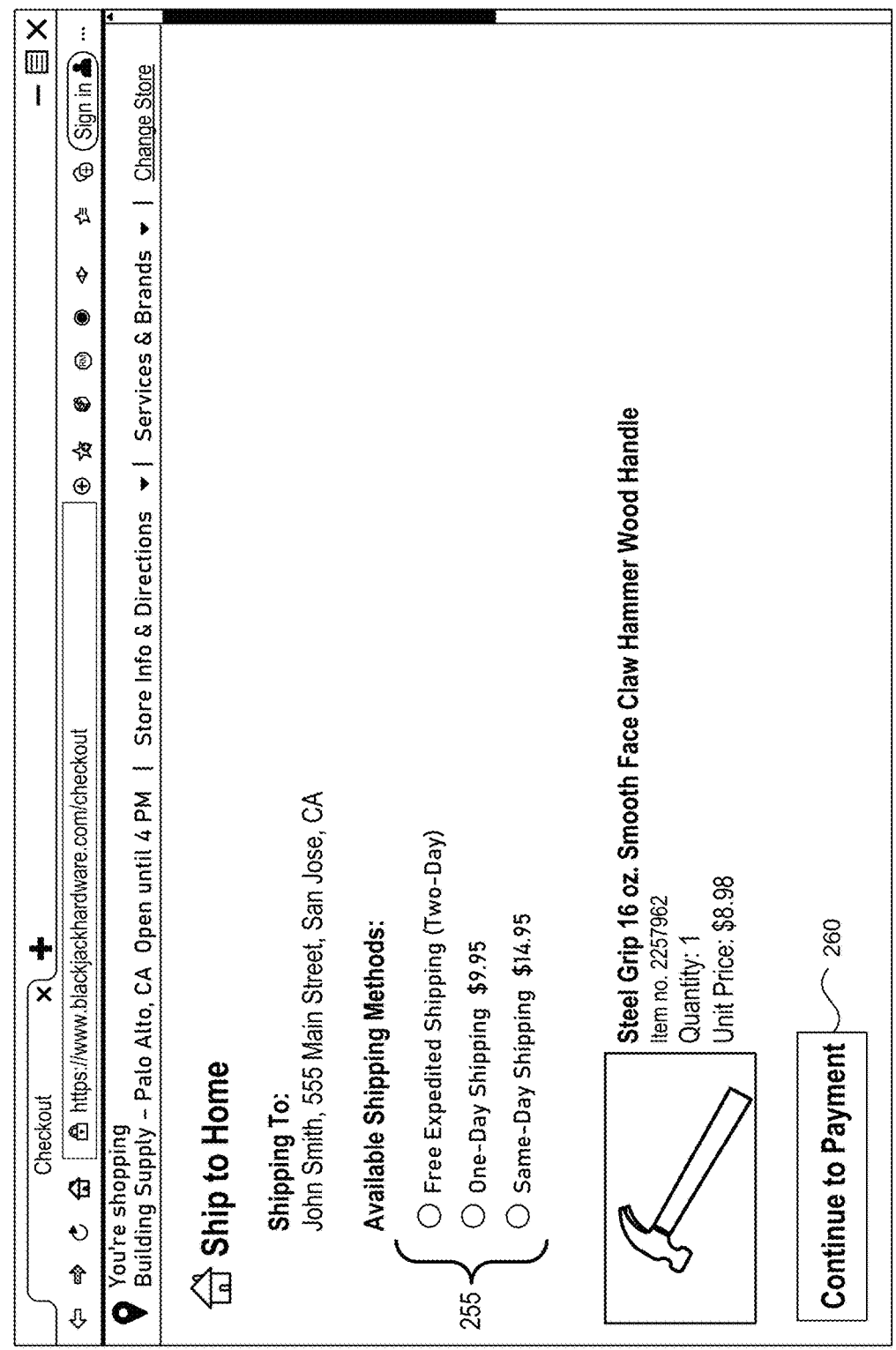
FIG. 2C is a display diagram illustrating an example user interface that is generated by the electronic shopping chart to provide a customer information about available shipping options for an order.

FIG. 2C is a display diagram illustrating an example checkout user interface 250 that is generated by the electronic shopping cart to provide the customer information about available shipping options. As will be described in additional detail herein, in some system configurations, once the customer selects the checkout button 240 the merchant or third-party computing system transmits an electronic order inquiry to a fulfillment system. The electronic order inquiry is transmitted via an application programming interface (API) that allows service calls to be made to the fulfillment system. The order inquiry includes relevant details about the customer's order to allow the fulfillment system to assess various shipping options that can be offered for that order. The order inquiry typically includes item information 245, such as an item number or unique identifier, as well as a quantity selected using the quantity control 230 of that item. The order inquiry further typically includes address information associated with the customer, whether specific address information (e.g., the street address of the customer) or general address information (e.g., the zip code where the customer resides). As described below, the fulfillment system uses the information contained in the order inquiry message to identify various fulfillment options for the order. The fulfillment options may depend on, for example, the time the order is received, the stock levels of ordered product at different warehouses, and the carriers that can pick up at those warehouses. Several permutations of fulfillment options may be generated by the system using these and other factors.

Once the fulfillment system has generated different fulfillment options, the fulfillment system transmits an electronic fulfillment response message to the merchant or third-party's computing systems. As will be described herein, using business rules that are specified by the merchant, the merchant can then use the fulfillment options to determine one or more shipping options 255 to display to the customer in the checkout interface 250. The displayed shipping options 255 can include information about expected delivery times (e.g., same-day, next-day, two-day, etc.) and a price for each shipping option. Information about displayed shipping options 255 can also include a carrier providing each shipping option and/or a time period in which the order must be submitted to receive the indicated shipping option (e.g., within 5 minutes, 10 minutes, an hour, two hours, or before a certain cutoff time during the day on which the item is placed in the electronic shopping cart). After selecting one of the shipping options 255, the customer can submit payment by selecting a continue to payment button 260 to complete the order. Upon completing the order, the order is submitted to the fulfillment system, whereupon the order is fulfilled by shipping ordered product from one or more of the warehouse nodes using one or more carriers that will meet the customer's selected shipping option.

Figure 3:
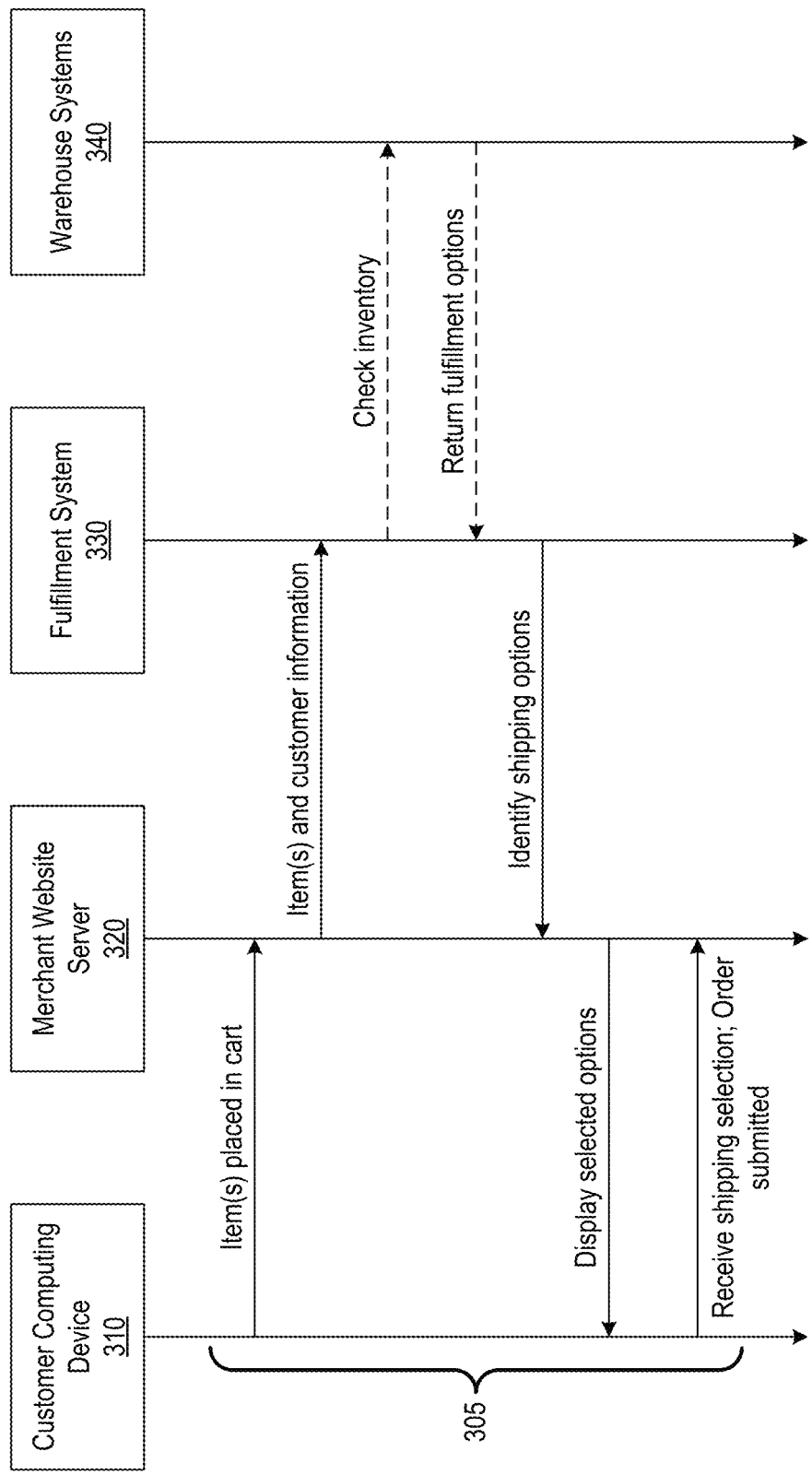
FIG. 3 is a flow diagram illustrating operations for electronically receiving an order inquiry and identifying fulfillment options during the order checkout process.

FIG. 3 is a flow diagram illustrating operations for receiving an order inquiry from a customer using a customer computing device 310 via a merchant website accessed through a website server 320 and identifying fulfillment options for the potential order. A customer, via a customer computing device 310, accesses a merchant website, such as the merchant website depicted in interface 200. Upon identifying one or more items that the customer wishes to purchase, the customer places the item(s) in an electronic shopping cart, as illustrated by the interface 225 of FIG. 2B. When the customer has selected the item or items that they wish to purchase, the customer proceeds to a checkout interface 250. Upon receiving such an indication from the customer of an intent to potentially purchase products, a merchant website server 320 transmits an electronic order inquiry to the fulfillment system 330 via an API of that system. In some implementations, the electronic order inquiry can be triggered by a JavaScript widget on a webpage of the merchant website, such as a widget on a product detail page. (The merchant website server 320 may be operated by the merchant or may be operated all or in part by a third party, such as a website that uses a third-party service to provide shopping chart functionality.) The electronic order inquiry provides information about the item and the customer to the fulfillment system 330. The information includes item description and/or item identifier information, item quantity information, and address information associated with the customer. The address information may be precise address information of the customer, such as a street address of the customer, or imprecise address information of the customer such as ZIP code, city, etc. Using the received item identifier and quantity information and the address information, the fulfillment system 330 accesses information about the one or more warehouse nodes in order to assess fulfillment options. The accessed information includes information about those warehouse nodes that are within proximity of the customer and can deliver to the customer at the provided address information, information about the stock levels of the requested item in proximate warehouse node(s), and identification of available carriers and carrier delivery options to ship the item from the proximate warehouse(s) to the customer address. The information about the one or more warehouse nodes may be obtained by transmitting a check inventory request to computing systems 340 of each of the proximate warehouse nodes that can deliver to the customer address to determine whether the item is in stock in sufficient number to satisfy the customer's order. Systems at a warehouse node receive the check inventory request and respond with an inventory level and with different delivery options to the order fulfillment system 330. Alternatively, rather than sending the request to the one or more warehouse nodes computing systems 340, the fulfillment system 330 may maintain or access a database of inventory information associated with the one or more warehouse nodes to determine availability of the item in one or more warehouse nodes. The maintained database of inventory information may be periodically updated by querying the one or more warehouse nodes to reconcile item and stock levels at those warehouses with the database of inventory information received by the fulfillment system. In these and other implementations, the check inventory request can be omitted and/or transmitted after an order is submitted to confirm inventory.

After receipt of shipping options from the warehouse nodes, the fulfillment system 330 transmits an electronic fulfillment response message to the merchant website server 320. The fulfillment response message includes, among other possible information, an indication of available shipping options for the one or more items that are received in the electronic order inquiry. In some embodiments, all shipping options are returned in the fulfillment response message, meaning that for each item, every shipping option for that item is provided to the merchant website server 320. In some embodiments, the fulfillment system returns only those shipping options that are common across all items in the order inquiry. That is, the fulfillment system only returns shipping options that apply to all items contained within the order. It will be appreciated that other permutations of shipping options may be returned to the merchant website, depending on the number of shipping options that the merchant would like to display to the customer.

In addition to the available shipping options, the fulfillment system 330 may also return certain details associated with those shipping options. For example, the fulfillment system may identify the identity of the carrier or carriers capable of delivering each item, costs for each level of service, and cutoff times for order submission at each level of service.

After receipt of the shipping options, the merchant website server 320 may display one or more of the received shipping options to the customer. The number and type of shipping options to display to customers may be determined by one or more business rules that the merchant configures.

The customer selects the desired shipping speed and places an order via the order completion process.

While shipping options are typically displayed to the customer during the checkout process, the shipping options might be displayed at other times during the product browsing process. For example, a merchant may want to display available shipping options on an item detail page to a customer. To do so, before serving an item detail page to the customer, the merchant website may send an electronic order inquiry to the fulfillment system 330 with an item quantity of one and a generalized address associated with the customer (e.g., a zip code). In response to receiving a fulfillment response message with available shipping options, the merchant can display the shipping options available at the time the item detail page is displayed to the customer. By doing so, the customer is apprised of the availability expedited delivery services (e.g., 2-hour, same day, next day) associated with the product that they are currently viewing. As discussed herein, by doing so the availability of expedited services is dynamically updated based on the particular time of day that the customer is viewing the product information. As another example, rather than check the availability of different shipping options before an order is placed, a merchant may elect to present default shipping options to a customer during the checkout process. When the customer order is placed, the merchant website may send an electronic order inquiry via the API to the fulfillment system 330 with the ordered product quantity and the shipping address associated with the customer. If the resulting fulfillment response message from the fulfillment system 330 indicates the shipping option selected by the customer is not available, the merchant can immediately message the customer and display the available shipping options instead. Otherwise, the shipping option selected by the customer during checkout will be used.

Figure 4:
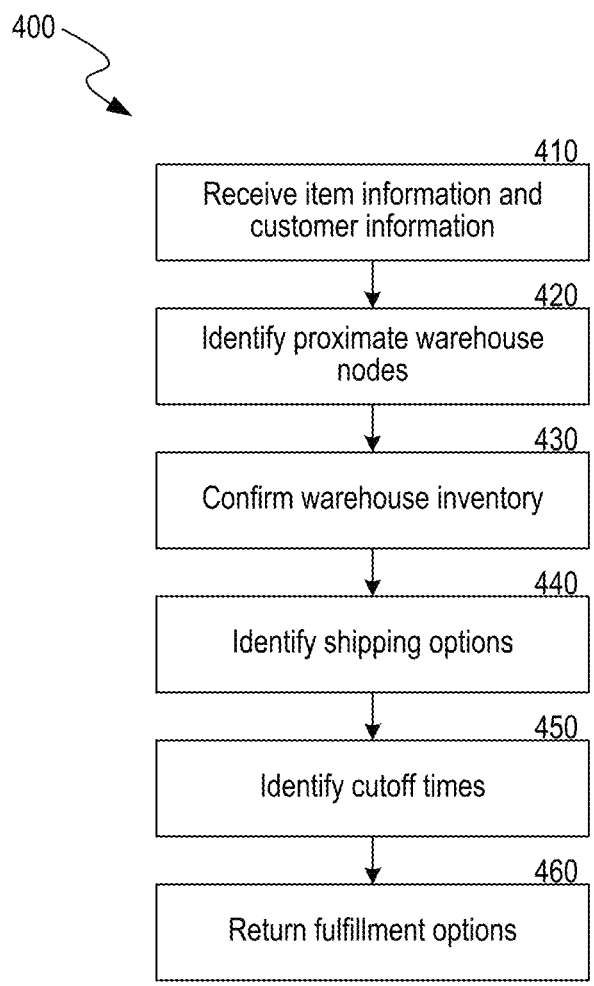
FIG. 4 is a flow diagram illustrating a process for dynamic identification of fulfillment options during the order checkout process.

FIG. 4 is a flow diagram illustrating a process 400 for identifying fulfillment options in response to an order inquiry. The process begins at block 410, where the system receives item information and customer information in an electronic order inquiry sent from a merchant computing system or a third-party computing system on behalf of the merchant. The item information and customer information is received, for example, via an API of the fulfillment system. The following is a first representative format for the electronic order inquiry message:

Item ID, Item Quantity, Shipping Address

In some embodiments the electronic order inquiry may also include a timestamp associated with the inquiry as well as an indication of a list of desired shipping options that are to be assessed to determine if available for the identified items. The following is a second representative format for the electronic order inquiry message with the additional requested information (i.e., timestamp and requested shipping options):

```
{
  "requestTime": "2000-01-23T04:56:07.000+00:00",
  "address": {
    "country": "US",
    "city": "Seattle",
    "postcode": "98104",
    "line3": "line3",
    "region": "WA",
    "line2": "line2",
    "line1": "line1"
```

-continued

```
  },
  "reservationId": "reservationId",
  "orderLines": [
    {
      "quantity": 1,
      "sku": "sku"
    },
    {
      "quantity": 1,
      "sku": "sku"
    }
  ],
  "desiredServiceLevels": [
    "Carrier A Same Day",
    "Carrier B Priority Overnight",
    "Carrier B SameDay City Priority"
  ]
}
```

As described herein above, the item information can be determined when a customer selects an item and places it in an electronic shopping cart, when the customer views a product detail page on a website, when the customer is completing a check-out process with selected items, or any other time where a customer has expressed an interest in an item. The item information can include an item name, an item identifier (e.g., a stock-keeping unit (SKU)), or any other unique identifier that allows the fulfillment system to identify the item being sold by the merchant. The item information may also include a number of units the customer is interested in purchasing, or the item quantity may be assumed by the fulfillment system to be a single item if no quantity is provided. The customer information includes either specific or general address information about the customer (e.g., a shipping address, a ZIP code, a destination city, etc.). The customer information is received by the merchant website from a customer, and may be received as an input from the customer during a checkout process, as part of an account registration process with the website, or as part of a query made to the customer by the website. In some embodiments, the general location of the customer may be estimated by the merchant website using, for example, the customer's IP address. At block 410, the system may further generate a timestamp indicating the time at which the item and customer information is received.

At block 420, the fulfillment system identifies one or more warehouse nodes associated with the queried item(s) and serving the customer address. (In this context, "serving" means that carriers are able to pick up items from the warehouse node and deliver those items to the customer within a reasonable period of time.) For example, the system can use an item identifier (e.g., a SKU code) and a customer address (e.g., a ZIP code) to query a database of warehouse nodes and identify each warehouse node serving the customer address and typically stocking the queried item(s). In some implementations, warehouse nodes are identified based on proximity to the customer address (e.g., by only identifying warehouse nodes below a certain threshold distance, or by identifying the closest warehouse nodes to the customer address).

At block 430, the fulfillment system confirms inventory for the queried item(s) at each of the warehouse nodes identified at block 420. For example, the system can query the warehouse node to identify whether the item is available in a sufficient quantity to fulfill the order inquiry. Alternatively, the system can confirm inventory using a centralized source of inventory information for multiple warehouse nodes, which is updated periodically (e.g., hourly, daily, weekly, etc.) and/or in response to triggering events (e.g., inventory checks) to reflect current inventory levels at each of the warehouse nodes. When the inventory information is centralized, the fulfillment system may map data maintained by each warehouse to a common item taxonomy maintained by the fulfillment system to facilitate determining inventory across different systems/nodes. In some implementations, the system determines whether a reserve quantity of the item is available, wherein the reserve quantity is greater than the quantity of items requested in the order. For example, the system can be configured to confirm whether inventory at a warehouse node equals or exceeds the quantity of the item ordered plus three items, four items, ten items, etc. In some implementations, the system only confirms available inventory if the inventory of the item at a warehouse node exceeds a threshold quantity (e.g., three items, four items, five items, etc.), and if the inventory meets or exceeds the quantity of items in the order. Confirming inventory based on reserve quantities and/or threshold quantities helps to ensure that a sufficient quantity of items will be available to fulfill an order, for example, in case the same item is also placed into an electronic shopping cart of another customer who might also order the item.

At block 440, the fulfillment system identifies, for each warehouse node with a sufficient quantity of the item, one or more shipping options by which the item can be delivered to the customer address. The fulfillment system may maintain, for example, a dataset of carriers that service each of the warehouse nodes, the service levels that those carriers offer for the transport of packages from that warehouse node, and the cost of each service level depending on weight or volume of the corresponding package. For example, the system can identify that warehouse node A can ship the item to the customer address using carrier A with same-day delivery or using carrier B with same-day delivery or next-day delivery, and warehouse node B can ship the item using carrier B with next-day delivery or carrier C with next-day delivery, and so forth. Available levels of service can be determined based on, for example, one or more carriers serving each warehouse node, and a proximity of the warehouse node to the customer address, such as whether the customer address is within a certain distance from the warehouse node, is located within a certain ZIP code, and so forth. In some implementations, the shipping options identified by the fulfillment system can be further constrained based on one or more preferences of a merchant and/or a third-party shopping cart service, such as constraining the shipping options to certain desired levels of service, a preferred carrier, and so forth.

At block 450, the fulfillment system identifies cutoff times for each shipping option identified at block 440. A cutoff time is a specific time before which an order for an item must be received at the warehouse to allow the order to be packaged and tendered to a carrier for delivery in accordance with the requested service level (e.g., same-day, next-day, etc.). In some implementations, the cutoff time is a fixed local time at the warehouse node, like 2:30 PM. In some implementations, a cutoff time is determined probabilistically based on a likelihood that an order can be fulfilled at an indicated level service. In some implementations, an identified cutoff time can include a margin of error. For example, a cutoff time of 1:00 PM may be identified because there is a high likelihood (e.g., 80%, 90%, 95%, etc.) that an order submitted at that time will be fulfilled at the indicated level of service. However, an order submitted slightly later (e.g., by 1:30 PM) may have substantially the same likelihood of being fulfilled at the identified level of service.

At block 460, the fulfillment system transmits via the API, to the merchant website server or to a third party service that provides website or shopping chart functionality, an electronic fulfillment response with a set of fulfillment options for the requested items. The fulfillment options may include for each item, for example, one or more shipping options, cutoff times for each shipping option, costs for each shipping option, and further details about each shipping option. In embodiments in which the electronic order inquiry includes an indication of a list of desired shipping options that are to be assessed to determine if available for the identified items, the fulfillment system transmits the availability of those services identified in the order inquiry.

The following is a representative format for the electronic fulfillment response:

Item ID, Shipping Options, Shipping Cost, Cutoff Times

The following is a representative format for the portion of the electronic fulfillment response which provides information about a shipping option for one of the identified items. The provided shipping option information includes the carrier identity, the cutoff time, the shipping cost, which days of the week the shipping option is available, and the estimated delivery window for that shipping option:

```
{
  "serviceLevels": [
    {
      "serviceLevel": "CarrierB SameDay City Priority",
      "reservationId": "reservationId",
      "timezone": "America/Los_Angeles",
      "slaDetails": {
        "workingDays": [
          1,
          2,
          3,
          4,
          5
        ],
        "cutoffHour": 14,
        "cutoffMinute": 30
      }
    },
    {
      "serviceLevel": "Flexe Same Day",
      "reservationId": "reservationId",
      "timezone": "America/Los_Angeles",
      "cost": {
        "amount": 13.23,
        "currency": "USD"
      },
      "estimatedDeliveryTime":
      "2022-12-19T16:39:57-08:00"
    }
  ]
}
```

Using the received fulfillment option data, the merchant or third party service can then display all or some of the fulfillment options to the customer. In some implementations, the merchant website displays only a portion of the fulfillment options, such as the three shipping options with the lowest cost, desired level of service, or other parameters, and the associated cost of each shipping option. In some implementations, the merchant website does not display the actual cost associated with each shipping option, but instead may display a free, discounted, or supplemented shipping cost. For example, the merchant may elect to cover the cost of shipping for all or certain segments of customers, and may therefore display certain shipping options as being available for free when the merchant is willing to cover the cost of the corresponding shipping. As another example, the merchant may elect to add a markup to the cost of shipping and may therefore display to all or certain segments of customers the received shipping cost plus the added surcharge. The merchant may also elect to display cutoff times by which the customer must place an order in order to be eligible for the selected shipping option (e.g., "order within the next 90 minutes in order to receive same day delivery") or may elect to not display certain shipping options if the cutoff times are too close to the time that the shipping options are being displayed to the customer.

The depicted process 400 shown in FIG. 4 represents just one embodiment of how fulfillment options can be dynamically determined in accordance with the present technology. In other embodiments, the operations of the process 400 can be changed while still maintaining a similar functionality. For example, the process (e.g., at block 410) can include receiving more or less information about the order and/or the customer (e.g., only a product identifier and a customer ZIP code). In some implementations, identifying actual cutoff times at block 450 can be optional and instead default cutoff times can be used for the various received shipping options.

In some implementations, cutoff times identified at block 450 are used to determine if a selected fulfillment option is still available when an order is placed. For example, although the system provides fulfillment options at block 460, a customer may wait a period of time before actually placing an order. When an order is subsequently received from the customer, the system may compare the time of the order receipt with the cutoff time and notify the customer that a fulfillment option is no longer available if the order time falls at or after the corresponding cutoff time for that fulfillment option.

In some implementations, the process 400 can include assigning an identifier to each received order inquiry. Order inquiry identifiers can be used by the system to track order inquiries and associate them with subsequently received orders. For example, if an order is received for an item that was part of a previous order inquiry, the order can refer back to an order inquiry using an order inquiry identifier, which allows the system to associate the order with fulfillment options, assess whether the order is submitted in time for the desired level of service, and so forth.

The process 400 can be implemented in a number of different ways. For example, some of the operations can be combined with each other or with operations of other processes described herein. In some embodiments, the process 400 is repeated by the fulfillment system to process multiple order inquiries. Some or all of the operations of the process 400 can be performed automatically by the system without input from a human operator. Identification of different fulfillment options in response to order inquiries is difficult to perform manually because of the large numbers of warehouse nodes involved, the different hardware or software systems used by different warehouse nodes, multifactorial analysis of different shipping options offered at different nodes to different addresses and at different levels of service, and so forth.

Figure 5:
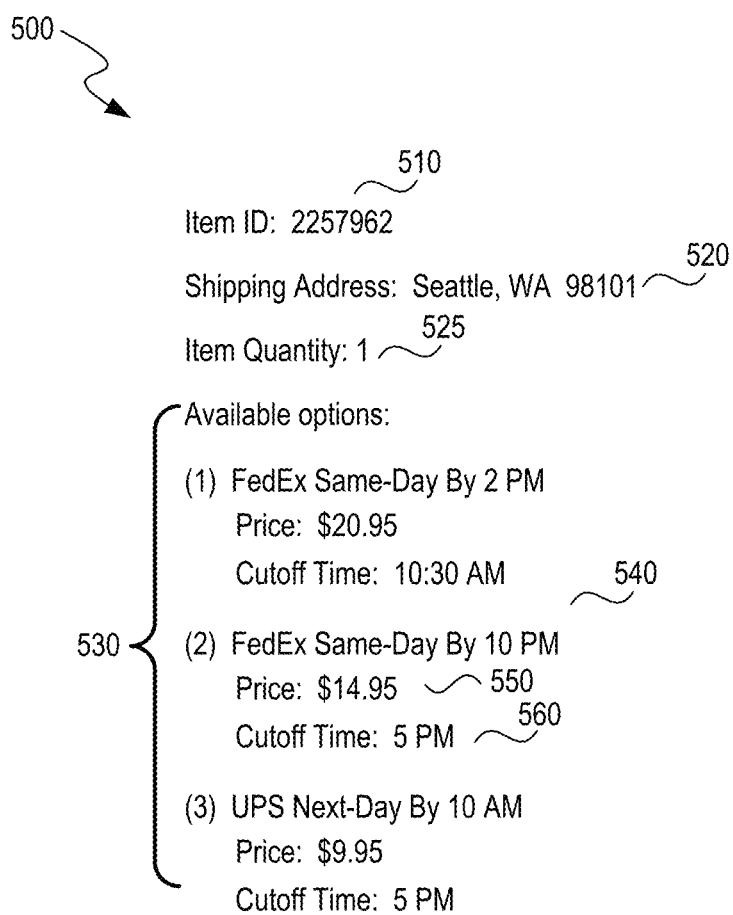
FIG. 5 is a diagram conceptually illustrating a schema of an example electronic fulfillment response exchanged via an application programming interface that, in response to electronic queries received during an ordering process, identifies fulfillment options using item information and customer information.

FIG. 5 is a diagram conceptually illustrating a schema 500 for an electronic fulfillment response that is exchanged via an application programming interface, the fulfillment response identifying fulfillment options responsive to an electronic order inquiry. The fulfillment response might be used, for example, to provide a set of fulfillment options to a merchant, as in block 460 of the process 400 depicted in FIG. 4. The schema 500 includes an item identifier 510 uniquely identifying the item to be delivered to the customer, an address 520 where the item is to be delivered, and an item quantity 525 received in the initial inquiry. It will be appreciated that the item ID, shipping address and item quantity may not be necessary in the fulfillment response if instead the fulfillment response includes a unique identifier that allows the response to be correlated with the previously received order inquiry. The schema 500 includes a set of fulfillment options 530 for delivering the item associated with the item identifier 510 to the customer at address 520. Each of the fulfillment options 530 includes a level of service 540, which can include a carrier and an estimated time (e.g., a time of day, which can specify a time zone) by which the item will be delivered (e.g., FedEx same-day by 2 PM, FedEx same-day by 10 PM, UPS next-day by 10 AM, etc.), a price 550 (e.g., an amount, which can specify a currency) at which the level of service is available, and a cutoff time 560 by which the order must be submitted on the current date to meet each level of service 540 (e.g., by 10:30 AM, by 5 PM, etc.). The schema 500 can include any number of available fulfillment options 530, and although the schema is shown in narrative form for pedagogical purposes, it will be appreciated that the actual data transmitted via the API will be encoded in such a fashion as to facilitate ease of transmission between computing systems. In some implementations, the electronic fulfillment response includes a timestamp (not shown) indicating a time that the fulfillment response was generated by the system.

Figure 6:
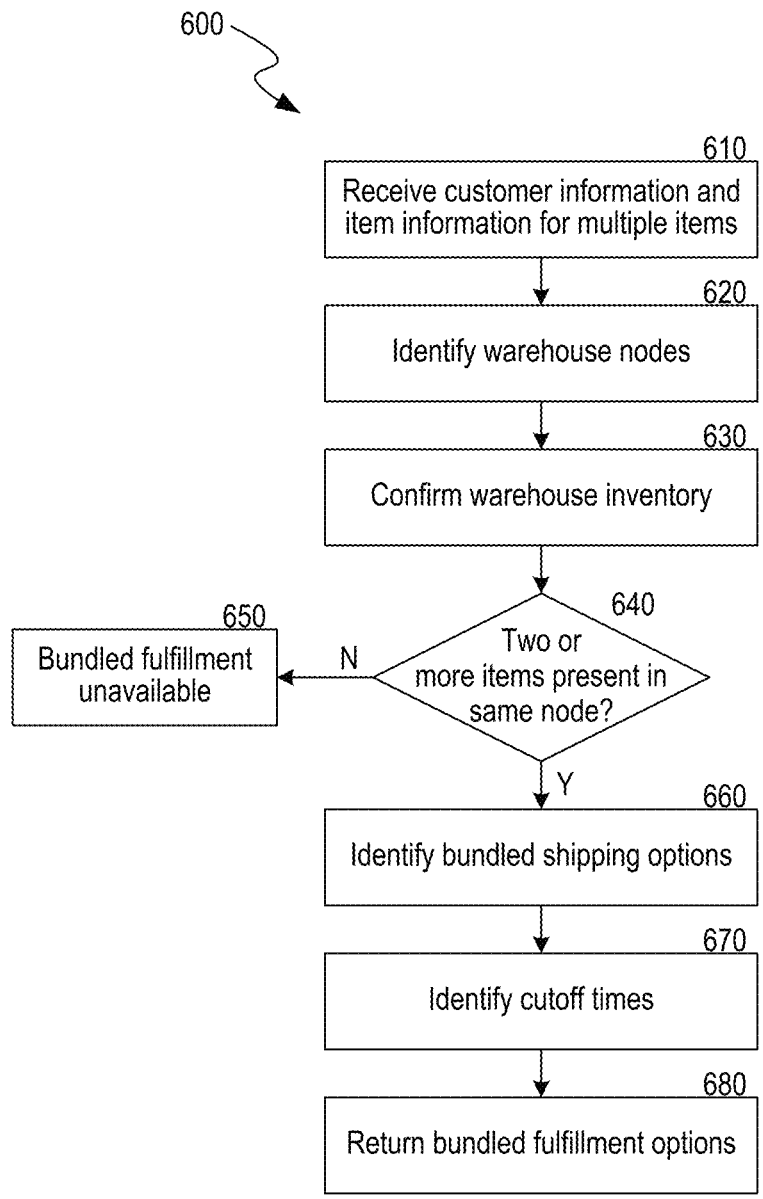
FIG. 6 is a flow diagram illustrating a process for dynamic identification of fulfillment options, including bundled fulfillment for two or more different items, during an order checkout process.

FIG. 6 is a flow diagram illustrating a process 600 for identifying bundled fulfillment options for multiple items fulfilled from the same warehouse node. The process begins at block 610, where the fulfillment system receives customer information and item information for multiple items. The customer information and item information can be as described above in relation to FIG. 4, except that multiple different items are included in the item information. The process 600 determines whether two or more of the items can be fulfilled in the same shipment.

At block 620, the system identifies warehouse nodes for each of the multiple items. Identifying warehouse nodes can be as described above in relation to FIG. 4.

At block 630, the system confirms warehouse inventory for each of the multiple items in each of the identified warehouse nodes. Confirming warehouse inventory can be as described above in relation to FIG. 4.

At decision block 640, the system determines whether at least two of the multiple items are present in the same warehouse node, in the desired quantities of interest to the customer, indicating that bundled shipping options may be available.

If at least two of the multiple items are not present in the same warehouse node, then the system proceeds to block 650, where it is determined that bundled fulfillment is not available for the multiple items. Accordingly, fulfillment options for each of the multiple items will be identified, as in process 400 described in FIG. 4, and shipping options associated with each individual item will be returned in the fulfillment response.

If at least two of the multiple items are present in the same warehouse node, then the process 600 proceeds to block 660, where bundled shipping options are identified. A bundled shipping option includes at least two of the multiple items to be delivered in a single shipment. Bundled shipping options are identified similarly to shipping options identified for a single item, based on, for example, carriers serving particular warehouse nodes, proximity to a customer address, available levels of services, preferences of the customer, merchant, or third-party shopping cart service, and so forth.

The process 600 proceeds to block 670, where cutoff times are identified for each of the bundled shipping options. As described above in relation to FIG. 4, cutoff times are times by which an order must be submitted to achieve a particular level of service.

The process 600 then proceeds to block 680, where bundled shipping options are transmitted in the fulfillment response. The bundled shipping options can be provided to the merchant website, the third-party shopping cart service, or other merchant service provider.

Figure 7:
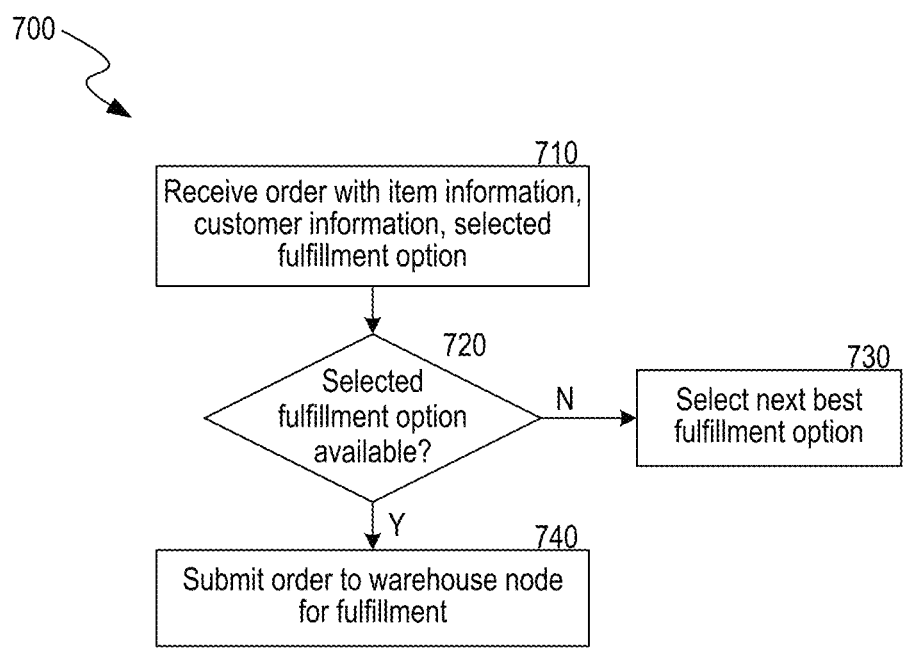
FIG. 7 is a flow diagram illustrating operations for fulfilling an order based on a received selection of a fulfillment option.

FIG. 7 is a flow diagram illustrating a process 700 for fulfilling a received order. The order can be received from a merchant web site, for example, by the fulfillment system after identifying fulfillment options according to the process 400 of FIG. 4 or the process 600 of FIG. 6. The process begins at block 710, where the system receives order information comprising item information for one or more items, customer information including at least an address associated with the customer, and a selected fulfillment option for the one or more items to be shipped to the customer address from a warehouse node via a carrier and at a selected level of service. The fulfillment option can be a fulfillment option identified according to, for example, the process 400 or the process 600. The fulfillment option can be selected by a customer via a merchant website, or the fulfillment option can be selected by the merchant website or the third-party electronic shopping cart service.

The process 700 proceeds to decision block 720, where the system determines whether the selected fulfillment option is still available. This determination can include, for example, re-confirming that a sufficient quantity of items is available at the warehouse node associated with the selected fulfillment option and/or determining whether the order is received before a cutoff time associated with the selected fulfillment option. Determining whether the order is received before a cutoff time can include comparing when the order is received by the system with the cutoff time previously provided in the fulfillment response.

If the selected fulfillment option is not available, then the process 700 proceeds to block 730, where a next best fulfillment option is selected. For example, the next best fulfillment option may be an alternative fulfillment option that meets the same level of service at a higher cost, an alternative fulfillment option with a faster level of service, or an alternative fulfillment option that will meet the next fastest level of service. For example, if a selected fulfillment option, which includes same-day delivery, is determined to be no longer available at block 720, then the system can automatically select next-day delivery when next-day delivery most nearly meets the level of service selected by the customer. Although not shown, the system at block 730 can alternatively notify the customer and/or the merchant website that the selected fulfillment option is no longer available, and request a selection of a different fulfillment option.

If the selected fulfillment option is determined, at block 720, to be available then the received order is submitted by the system to the warehouse node associated with the fulfillment option to be fulfilled at the level of service associated with the selected fulfillment option.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combination or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

Although certain embodiments herein are described in the context of "warehouse nodes," it will be appreciated that the system and methods herein are applicable to many different kinds of facilities for storing inventory and are not limited to commercial warehouses. Additionally, a "carrier" as described herein includes any provider of services for transportation of inventory by ground, air, water, or combinations thereof. As described herein, a "merchant" can be a vendor, retailer, reseller, or any other individual or entity providing inventory for sale.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system and method may vary considerably in their specific implementations, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

Although not required, aspects of the disclosed system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions may reside on a client computer.

We claim:

1. A computer-implemented method of identifying fulfillment options for an item sold via a merchant website, the method comprising:
    accessing a plurality of non-standardized warehouse data structures at a centralized server, each non-standardized warehouse data structure being associated with a warehouse node operated by an entity other than the merchant,
        wherein the warehouse nodes provide the warehouse data structures in different, non-standardized formats, and
        wherein a first warehouse data structure of the plurality of non-standardized warehouse data structures is in a first communication format generated by a first software of a first warehouse node and a second warehouse data structure is in a second communication format generated by a second software of a second warehouse node;
    receiving, in an electronic order inquiry, item information about an item available for sale via a merchant website, the item information including an item identifier and an item quantity,
        wherein the item information is received in response to the item being placed, by a customer, into an electronic shopping cart associated with the merchant website;
    receiving, in the electronic order inquiry, customer information about the customer, the customer information including an address associated with the customer;
    identifying, based at least in part on the item identifier and the address associated with the customer, at least one warehouse node;
    determining, at the centralized server, based on warehouse node information from the non-standardized warehouse data structures, values for a set of standard parameters including inventory levels, available carriers, or location of the at least one warehouse node,
        wherein the standard parameters are in a uniform communication format specific to the centralized server;
    confirming availability, at the at least one warehouse node, of a threshold quantity of the item based on the values of the set of standard parameters, the threshold quantity being greater than or equal to the item quantity;
    identifying carrier information of at least one carrier associated with the at least one warehouse node,
        wherein the carrier information includes available levels of carrier service, prices associated with each of the available levels of carrier service, and cutoff order times associated with each of the available levels of carrier service;
    determining two or more fulfillment options by which the item can be delivered to the address from the at least one warehouse node via the at least one carrier; and
    transmitting, in a fulfillment response, the two or more fulfillment options by which the item can be delivered to the address from the at least one warehouse node via the at least one carrier.

2. The computer-implemented method of claim 1, further comprising:
    receiving an electronic order for the item, the electronic order including a selected fulfillment option of the two or more fulfillment options;
    determining an order time at which the electronic order is received; and
    comparing the order time to a cutoff order time for the selected fulfillment option to determine availability of a level of carrier service for the selected fulfillment option.

3. The computer-implemented method of claim 1, further comprising:
    receiving, from the at least one warehouse node, inventory information; and
    converting the received inventory information into a standardized data format.

4. The computer-implemented method of claim 1, wherein at least some of the available levels of carrier service are associated with expedited item shipping with same-day delivery or next-day delivery.

5. The computer-implemented method of claim 1, wherein the electronic shopping cart associated with the merchant website is provided by a third-party service.

6. The computer-implemented method of claim 1, wherein the electronic order inquiry is received via an application programming interface (API).

7. The computer-implemented method of claim 1, wherein the address associated with the customer comprises a ZIP code or a city.

8. A computer-implemented method of providing fulfillment options to a customer device via a merchant website, the method comprising:
    accessing a plurality of non-standardized warehouse data structures at a centralized server, each non-standardized warehouse data structure being associated with a warehouse node operated by an entity other than the merchant,
        wherein the warehouse nodes provide the warehouse data structures in different, non-standardized formats, and
        wherein a first warehouse data structure of the plurality of non-standardized warehouse data structures is in a first communication format generated by a first software of a first warehouse node and a second warehouse data structure is in a second communication format generated by a second software of a second warehouse node;

receiving, from a customer device and via a merchant website, a selection of an item available for sale via the merchant website, the item being associated with item information including an item quantity and an item identifier,
  wherein the selection of the item is received in response to the item being placed, by a customer associated with the customer device, into an electronic shopping cart associated with the merchant website;
receiving, from the customer device and via the merchant website, customer information about the customer, the customer information including an address associated with the customer;
determining, at the centralized server, based on warehouse node information from the non-standardized warehouse data structures, values for a set of standard parameters including inventory levels, available carriers, or location of at least one warehouse node,
  wherein the standard parameters are in a uniform communication format specific to the centralized server;
sending, to a fulfillment system, an electronic order inquiry that includes the item information and the customer information;
receiving, from the fulfillment system, a fulfillment response that includes two or more fulfillment options by which the selected item can be delivered to the address from at least one warehouse node and via at least one carrier,
  the at least one warehouse node is identified based at least in part on the item identifier, the address associated with the customer, and a threshold quantity of the item available via the at least one warehouse node based on the values for the set of standard parameters for the at least one warehouse node, the threshold quantity being greater than or equal to the item quantity, and
  wherein the at least one carrier is associated with carrier information comprising available levels of carrier service, prices associated with each of the available levels of carrier service, and cutoff order times associated with each of the available levels of carrier service; and
causing display, via the merchant website, of at least one fulfillment option of the two or more fulfillment options by which the selected item can be delivered to the address from the at least one warehouse node and via the at least one carrier.

9. The computer-implemented method of claim 8, further comprising:
receiving, from the customer device and via the merchant website, an order for the item, the order including a selection of a fulfillment option; and
transmitting, to the fulfillment system, the order for the item to be fulfilled according to the selected fulfillment option.

10. The computer-implemented method of claim 8, wherein the displayed at least one fulfillment option is selected based on one or more business rules configured based on fulfillment costs borne by a merchant associated with the merchant website.

11. The computer-implemented method of claim 8, wherein the selection of the item available for sale via the merchant website is received via an electronic shopping cart provided by a third-party service.

12. The computer-implemented method of claim 8:
wherein causing display of the at least one fulfillment option includes causing display of a price for the at least one fulfillment option, and
wherein the displayed price for the at least one fulfillment option is different from a price associate with an available level of carrier service for the at least one fulfillment option.

13. The computer-implemented method of claim 8, wherein causing display of the at least one fulfillment option includes causing display of a cutoff time for the at least one fulfillment option.

14. A non-transitory computer-readable medium carrying instructions that, when executed by a computing system, cause the computing system to perform operations to identify fulfillment options for an item sold via a merchant website, the operations comprising:
accessing a plurality of non-standardized warehouse data structures at a centralized server, each non-standardized warehouse data structure being associated with a warehouse node operated by an entity other than the merchant,
  wherein the warehouse nodes provide the warehouse data structures in different, non-standardized formats, and
  wherein a first warehouse data structure of the plurality of non-standardized warehouse data structures is in a first communication format generated by a first software of a first warehouse node and a second warehouse data structure is in a second communication format generated by a second software of a second warehouse node;
receiving, in an electronic order inquiry, item information about an item available for sale via a merchant website, the item information including an item identifier and an item quantity,
  wherein the item information is received in response to the item being placed, by a customer, into an electronic shopping cart associated with the merchant website;
receiving, in the electronic order inquiry, customer information about the customer, the customer information including an address associated with the customer;
identifying, based at least in part on the item identifier and the address associated with the customer, at least one warehouse node;
determining, at the centralized server, based on warehouse node information from the non-standardized warehouse data structures, values for a set of standard parameters including inventory levels, available carriers, or location of the at least one warehouse node,
  wherein the standard parameters are in a uniform communication format specific to the centralized server;
confirming availability, at the at least one warehouse node, of a threshold quantity of the item based on the values of the set of standard parameters, the threshold quantity being greater than or equal to the item quantity;
identifying carrier information of at least one carrier associated with the at least one warehouse node,
  wherein the carrier information includes available levels of carrier service, prices associated with each of the available levels of carrier service, and cutoff order times associated with each of the available levels of carrier service;

determining two or more fulfillment options by which the item can be delivered to the address from the at least one warehouse node via the at least one carrier; and transmitting, in a fulfillment response, the two or more fulfillment options by which the item can be delivered to the address from the at least one warehouse node via the at least one carrier.

15. The non-transitory computer-readable medium of claim 14, wherein the operations further comprise:

receiving an electronic order for the item, the electronic order including a selected fulfillment option of the two or more fulfillment options;

determining an order time at which the electronic order is received; and comparing the order time to a cutoff order time for the selected fulfillment option to determine availability of a level of carrier service for the selected fulfillment option.

16. The non-transitory computer-readable medium of claim 14, wherein the operations further comprise:

receiving, from the at least one warehouse node, inventory information; and converting the received inventory information into a standardized data format.

17. The non-transitory computer-readable medium of claim 14, wherein at least some of the available levels of carrier service are associated with expedited item shipping with same-day delivery or next-day delivery.

18. The non-transitory computer-readable medium of claim 14, wherein the electronic shopping cart associated with the merchant website is provided by a third-party service.

19. The non-transitory computer-readable medium of claim 14, wherein the electronic order inquiry is received via an application programming interface (API).

20. The non-transitory computer-readable medium of claim 14, wherein the address associated with the customer comprises a ZIP code or a city.

* * * * *